Figure 1:
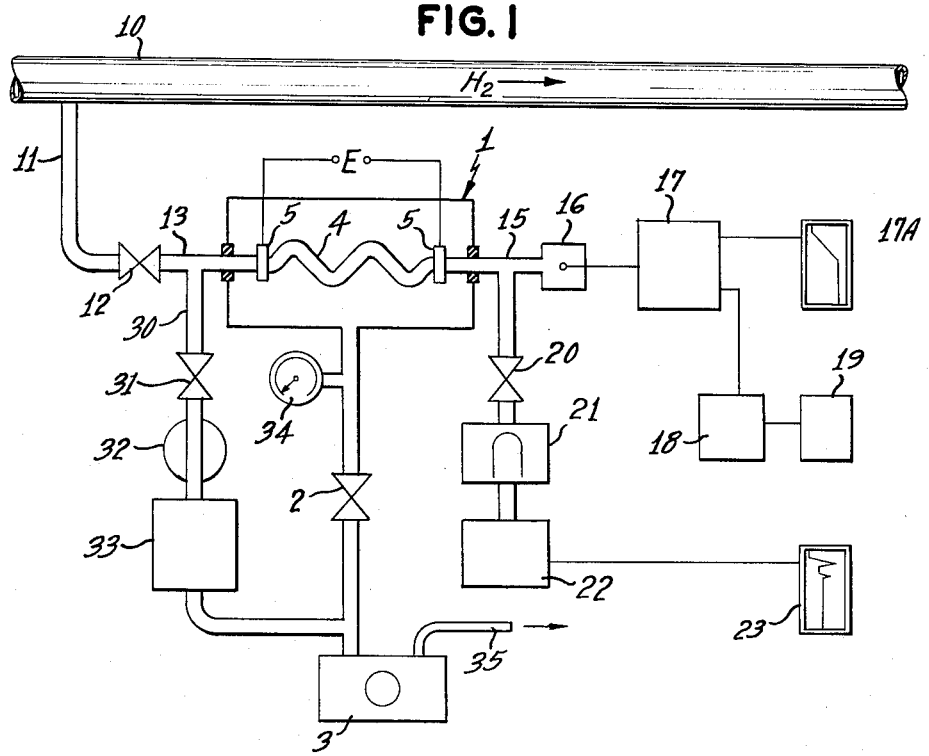

July 5, 1966 P. MÜLLER 3,258,896
DETERMINATION OF IMPURITIES IN PURE
GASES, PREFERABLY HYDROGEN
Filed Oct. 24, 1963 2 Sheets-Sheet 1

INVENTOR.
PAUL MÜLLER
BY Samuel Kahn
ATTORNEY

United States Patent Office 3,258,896
Patented July 5, 1966

3,258,896
DETERMINATION OF IMPURITIES IN PURE
GASES, PREFERABLY HYDROGEN
Paul Müller, Ostheim, near Hanau am Main, Germany, assignor to W. C. Heraeus G.m.b.H., a corporation of Germany
Filed Oct. 24, 1963, Ser. No. 318,758
Claims priority, application Germany, Nov. 3, 1962, H 47,314
2 Claims. (Cl. 55—16)

The invention pertains to the determination of impurities, especially the control of purity in gases, preferably hydrogen, using for that gas a semi-permeable membrane of palladium or palladium alloys.

The specific permeability of palladium, especially of heated palladium membranes, for hydrogen has been known for a long time. This property has been used also for the manufacturing of pure hydrogen gas, and for leak detection in vacuum equipment with hydrogen as a test gas. There are other similar contributions of correlated substances in which as gas can permeate the correlated solid, such as $O_2$-Ag; $N_2$-Mo; $N_2$-Fe; He-certain glasses or quartz; certain organic gases-specific resins (or zeolites), etc. On the other hand, there is a variety of known methods for the physical analysis of purity control of gases utilizing e.g.; the irregular magnetic acoustic or thermal properties of individual gases. Those methods have found a wide practical acceptance and—just to name one instance—are used in caloric power plants for the analysis of stack gases and, based thereon, for the control of fuel combustion. Those methods work very well for larger concentrations of the gases to be determined, and are almost restricted to this range of concentrations. For the determination of small concentrations of gases, or of impurities in gases the purity of which is to be monitored, only few methods are useful. Thus, for instance, the determination of small amounts of $O_2$ in other pure gases by the known magnetic methods is interfered with by the ever present amount of argon whose molecules are also paramagnetic, although considerably less so than the oxygen molecules. All other methods, too, are subject to similar interferences so that all of them have a limit of sensitivity which no longer satisfies the present days' requirements for extreme purity control. In recent years gas chromatographical methods have been widely used which, however, are not too well suited for industrial controls due to the high accuracy required therein, and the variety of procedures particular to each gas. Their sensitivity is significantly higher than the one of the methods indicated above (in thermo-conductivity based instruments about 0.01% in $H_2$). It amounts to ca. 0.1 to 0.01% (1000–100 p.p.m.) for the determination of impurities in pure gases. While this high sensitivity is fully sufficient for many purposes, it is still inadequate for certain special applications.

It is an objective of the present invention to develop a method for the control of purity in gases which combines extreme sensitivity (e.g. detection of <1 p.p.m. impurities) with the requirements of plant operation. The invention concerns the detection of trace impurities in very pure gases, making use of the known method of separating said gases from impurities through an especially selected semipermeable membrane.

According to the invention, the problem is solved by a method characterized by introducing a stream of test gas into a primary, preferably small chamber, essentially limited by said semi-permeable membrane, removing the pure gas continuously from a secondary chamber upon its permeation through said membrane, and locating the sensor of a known instrument for analysis of the gas in the primary chamber or in communication therewith. In an especially preferred realization, said primary chamber is arranged as an inner and comparatively long chamber, into one end of which the gas is introduced and at the other end of which the gas analyser is located.

The following example is based on this mode of realization. It deals with the determination of impurities in hydrogen, and hence comprises semi-permeable membranes of Pd. If other combinations of gas and membrane (such as mentioned above) are used the apparatus may serve for the examination of these other gases. Based on the example, the function of the invention is described, its advantages are indicated, and further suggestions made for its development.

Figure 3:
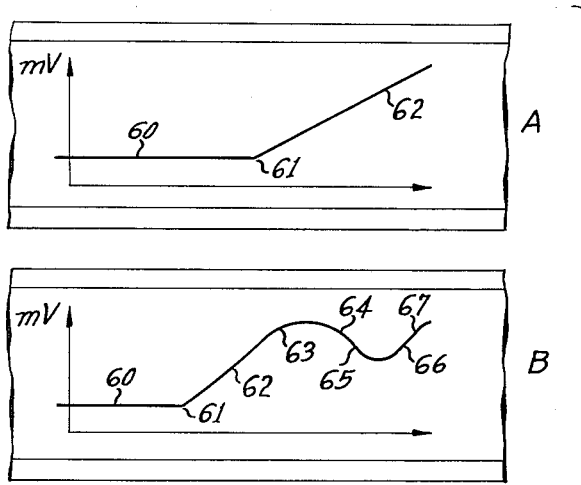
Figure 2:
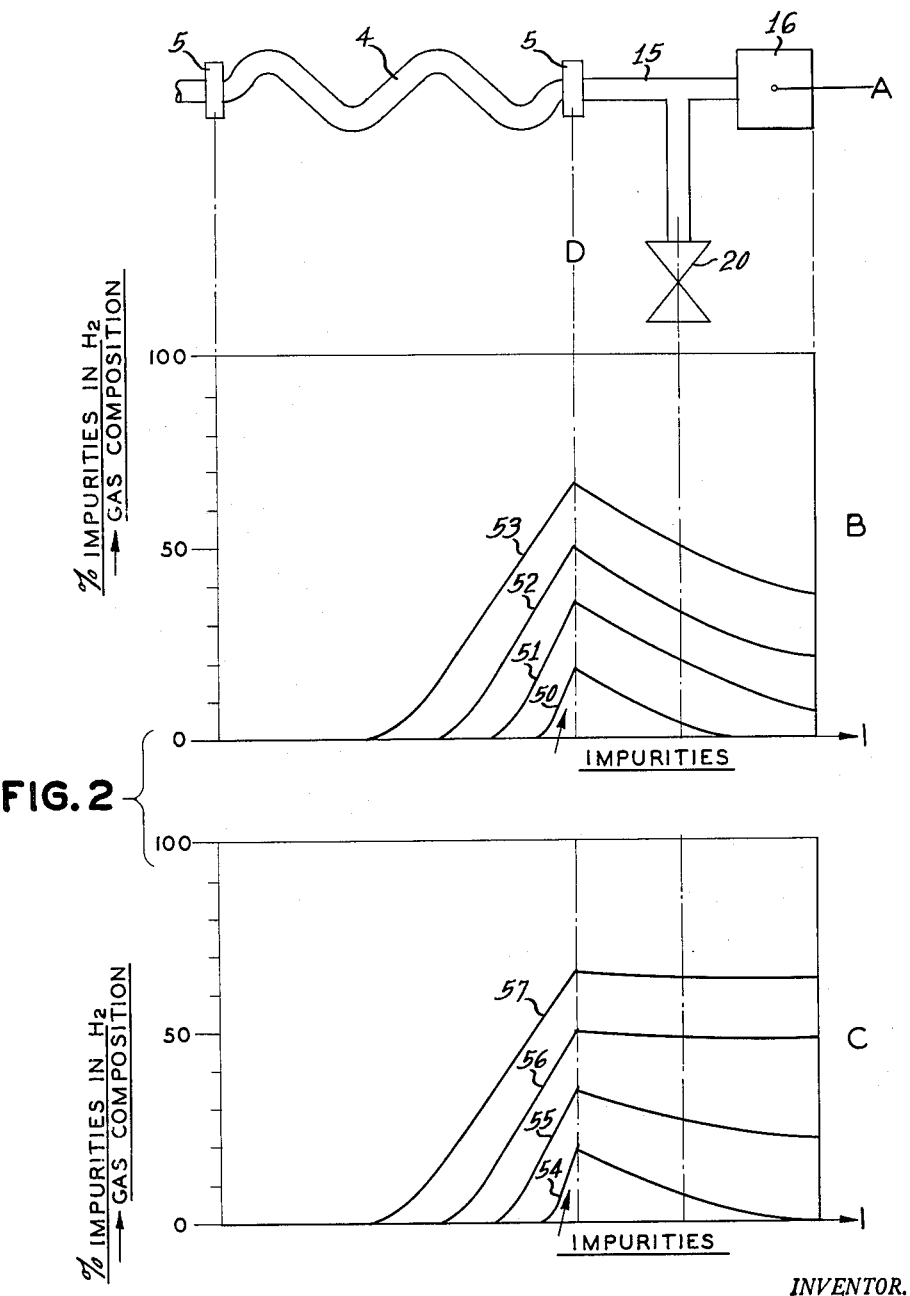

FIG. 1 shows a diagram of the apparatus.
FIG. 2 a schematic of the measuring procedure.
FIG. 3 a recorded curve for the measurement.

The heart of the instrument is the outer chamber 1 which is evacuated through valve 2 by the mechanical vacuum pump 3, and contains the small inner diffusion and measuring chamber 4. That consists of a palladium tube sealed into the walls of the outer chamber, and heated directly by electrical current admitted through the contacts 5.

The hydrogen test gas flows into the inner chamber 4 from the main pipe 10 and over the branch line 11, the valve 12, and the connecting line 13. Hence, the hydrogen enters the tube-shaped diffusion chamber 4 at the left end. The right end is connected through a very short connecting line 15 with the measuring head 16 of the gas analyser. The volume of chamber 4 amounts to several ccm., e.g. about 4 ccm., the volume of the measuring head 16 (plus line 15) about 1 ccm. or but slightly more.

The measuring head—in the shown instance, a thermoconductivity instrument with a hot filament—is electrically connected with the instrument 17, which records the heat loss by conduction in the measuring head 16, on a recorder 17A.

The parts of the apparatus as hitherto described are operable without the ones presented below, as recognizable from their way of operation as given below. They are, however, supplemented by the following:

The instrument 17 is further connected with an integrator 18, which actuates a signaling device 19 whenever the measured and/or recorded value increases rapidly.

The connecting line 15, preferably, however, the space containing the sensor 16, is connected over valve 20 to a pump 21 having a suitably small capacity, e.g. a Topler pump with preceding needle valve, permitting to transfer gas from chamber 4 into a gas analyser 22, which, in turn, is electrically connected with a recorder 23.

The connecting line 13 connects with a branch line 30 which leads over valve 31, a cold trap 32, and, preferably, a diffusion pump 33 to the suction end of the vacuum pump 3. This part of the apparatus serves, with valve 31 open and valves 12, 2 and 20 closed, for evacuation of chamber 4 and measuring head 16. This is of especial importance whenever impurity determinations in extremely pures gases are required, and even very small amounts of other gases can introduce errors.

Furthermore, in order to avoid errors due to undesirable vapors, all walls and gasketing material in contact with the test gas should be made of metal. This is especially valid for the valves 12, 31, and 20. In contrast herewith, only hydrogen the composition of which is not measured flows through valve 2. Moreover, the palladium membrane separates valve 2 from chamber 4. Therefore, that valve may be constructed arbitrarily.

In explaining the determination of impurities by hydrogen according to the invention, we start with all chambers, tubes, etc. on the right hand side of valve 12 well evacuated, and all valves closed. Let line 10 contain a gas (hydrogen) the impurities of which are to be determined, under an arbitrary pressure, e.g. 2 atmospheres absolute. Let chamber 4, consisting of a Pd tube, be heated to a temperature suitable for diffusion, e.g. 400° C. Then, valve 12 is opened. The hydrogen fills, in this order, the connecting line 13, chamber 4, line 15, and the measuring head 16. Since the outer chamber is evacuated, hydrogen diffuses through the membrane of chamber 4 until pressure equilibrium is established. The pressure is measured and monitored by the pressure gauge 34, mostly a vacuum gauge. Upon opening valve 2 and starting up the vacuum pump 3, the hydrogen diffused from the inner chamber 4 into the outer chamber 1 is currently removed and transported through the exhaust line 35 of pump 3 into the atmosphere or, more conveniently, into a waste pipe not indicated on the diagram. The impurities contained in the hydrogen are restricted from taking the same path by the semi-permeable membrane of chamber 4; hence, they remain in the chamber.

In chamber 4, the remaining gas behaves as indicated in FIG. 2. Part 2A shows again the long chamber 4 and the connected measuring head 16. Here, we consider especially the length dimension from the left (where the test hydrogen enters) to the right as far as the measuring sensor 16. This length dimension has been chosen as abscissa of Part 2B and 2C of FIG. 2.

The hydrogen flows constantly from the left into the chamber 4 and leaves it through the walls. The impurities cannot permeate the walls and collect, due to the direction of the gas flow towards the right, at the right hand end of chamber 4, i.e. especially in the immediate vicinity D of the right hand, heated end of chamber 4 near the electrical terminal 5.

In FIG. 2B the gas composition is plotted as a function of the length $l$ of chamber 4. On the left side, the chamber is filled by the constantly onstreaming hydrogen. Toward the right end, the amount of impurities increases gradually, as e.g. indicated after 15 seconds by the left side slope of curve 50, after one minute by the slope of curve 53. However, there is no hydrogen withdrawn from the connecting line 15 and the measuring head 16, since these are not confined by semi-permeable membranes but, on the contrary, hermetically enclosed. Hence, the initially entered hydrogen remains there at the beginning, but then starts flowing out by way of diffusion out of chamber 4. The right side slope is a plot of the gas composition as a function of the length of connecting line 15 and the interior of measuring head 16. Thus the right side slope of the curves 50 to 53 initially descend as indicated when impurities begin to flow into the connecting line 15 to the measuring head 16. In order to avoid an undesirable and unnecessary time lag, the total volume right of location D is minimized.

As mentioned above, the measuring sensor 16 in the presented example measures the thermo-conductivity of the gas contained therein. The thermoconductivity $$\lambda(\text{in. } 10^{-5}) \frac{\text{cal}}{\text{cm. sec. degree}}$$

is for the more important gases under consideration:

| At 0° C. | At 100° C. | At 0° C. | At 100° C. |
|---|---|---|---|
| H₂ 39.60 | ca. 50 | N₂ 5.7 | 7.2 |
| He 33.60 | 39.9 | NH₄ 5.14 | 7.1 |
| Ne 10.9 | ca. 13 | H₂O | 5.5 |
| CH₄ 7.2 | | CO 5.4 | |
| O₂ 5.7 | 7.4 | A 3.9 | 5.1 |
| | | CO₂ 3.4 | 5.1 |

The measurement of the thermoconductivity and its decrease with major impurities is a known and, as seen from the above figures, specific method of analysis for hydrogen. For other gases, there are other specific methods, e.g. the measurement of paramagnetism and its decrease, for oxygen. Thus, the measuring sensor 16 can be chosen according to its specific purpose. Of course it is also possible to use gas chromatographs, ionization detectors, and others, which may increase the sensitivity of the complete apparatus by orders of magnitude, owing to their own high sensitivity.

The output of the measuring sensor 16 is transformed into an electrical signal e.g. in mv., in the instrument 17, and recorded by the recorder 17A. FIG. 3 shows a chart with a graph obtained in this way. As long as no enrichment of impurities takes place, curve 60 runs horizontal. At the time 61, the beginning of enrichment, the curve starts rising. The incline 62 is about linear and, of course, depends on the amount of test hydrogen passed, i.e. on the pumping rate of pump 3, and, on the other hand, on the concentration of impurities. At 0.01% (100 p.p.m.) impurities, and a pumping rate of 40 l/hr. (for atmospheric pressure), 4 ccm. NTP of impurities per hour remain in the measuring volume, i.e. in the volumes of chamber 4 and the measuring head 16. They would, accordingly, fill the measuring volume of about 5 ccm. almost completely. In the example in hand and for the method described, an output signal of 1 mv. (increase in voltage) is produced by the instrument 17 within 8 minutes (or ⅛ mv. in one minute). This signal can be considerably increased by adjusting the circuitry in the instrument in a known manner; this, however, has not been required yet in view of the sensistivity achieved of a few p.p.m., and an accuracy of indication of better than 1 p.p.m.

The slope of the incline depends, under otherwise equal conditions, on the concentration of impurities, for which it is a measure. In order to use the slope directly as a measure for controls, the integrator 18 is attached to the instrument 17, and so adjusted that it actuates the signal device 19 when a predetermined slope (e.g. 0.2 mv. per minute) is exceeded. Thus, a warning signal is given if and when the concentration of impurities is larger than a predetermined, permissible value.

One purpose of the valve 20, along with the subsequent pump 21, is to speed up indication. The pump sucks off the gas, and especially the hydrogen present in the volume $15\!\!\%_{16}$ at the beginning of the measurement, eliminating its back diffusion into he chamber. Thus, the enriched impurities fill this volume right from the beginning of the measurement. In FIG. 2C the curves 54 to 57 show how the curves 50 to 53 change when valve 20 is open and the pump 21 is operated at an appropriate suction rate, which can also be controlled by adjusting a needle valve (not indicated).

For this case, the output curves are characterized in FIG. 3B. The recorded curve shows, at first, a similar incline 62 but then approaches an equilibrium or maximum 63 due to the constant gas removal by suction. This is a measure for the prevailing concentration of impurities. If, at the time 64, this concentration decreases, a descending branch of the curve 65 is recorded which, again, approaches a constant value. If, however, at the line 66, the concentration increases, an ascending branch of the curve 67 is shown, with a different final value. In this case, too, the integrator 18 and the signal device 19 give a warning signal if the concentration of impurities becomes too large. The current concentration, however, is no more expressed by the slope of the curve, or the increasing voltage, but rather by the level finally reached by the indicating curve (or the output voltage of instrument 17). Thus, also a very slow, so to speak, "sneaking" increase of impurities can be monitored.

Besides the described expediting of indication and the better monitoring of impurities, the part of the apparatus designated by the numbers 20–23 serves more purposes.

The amounts of gas currently withdrawn by the pump 21 are, according to the pump rate, strongly enriched in impurities. They are transferred to a gas analyzer which monitors one or several compounds and records their amounts. This makes for a current control of their composition.

Furthermore, trace amounts of impurities can be detected, which would otherwise be insufficiently indicated by the measuring sensor 16 and the instrument 17. To this end, the previously open valve 20 is closed, and the apparatus operated for a longer period, e.g. 3 to 5 hours ($H_2$ volume passed, 120–200 l.), after complete evacuation of chamber 4. Then, pump 3 is shut down, valve 12 closed, valve 20 opened, and all the gas in the measuring volume evacuated through pump 21 into a sufficiently sensitive gas analyzer 22. Since the impurities have been largely enriched as a consequence of accumulated time, even extremely small amounts of impurities can be determined in this manner, with the use of recorder 23.

The last method described is a static method, as contrasted to the above-described dynamic method. Consequently, the valve 20 may also be connected with the left connecting line 13.

As seen clearly from the description, the apparatus and method of its operation according to the invention in hand are practically unlimited with regard to sensitivity and, therefore, are universally applicable. Through combinations with further known equipment, the apparatus can also be used for the control of various processes, such as mixing of gases etc.

What is claimed is:

1. Process for the determination and control of gas impurities in hydrogen using a semi-permeable membrane permeable for the hydrogen, characterized by introducing a stream of test hydrogen into a primary chamber essentially confined by said semi-permeable membrane, concurrently pumping off pure hydrogen which has permeated the semi-permeable membrane into a secondary chamber, permitting gas impurities to accumulate in the primary chamber, determining the presence of impurities in the hydrogen in the primary chamber by means of a gas analyzer responsive to at least one impurity in said hydrogen, said gas analyzer being in operable communication with the primary chamber, and subsequent to the accumulation of gas impurities in the primary chamber passing the resultant impurity enriched hydrogen from the primary chamber into a second gas analyzer and thereby determining the impurity content of the introduced test hydrogen with an accuracy of less than 1 p.p.m. impurity.

2. Process according to claim 1 in which the first gas analyzer is responsive to the thermoconductivity of a gas in the primary chamber and in which the presence and amount of impurity in the hydrogen in the primary chamber is revealed by a variation of the thermoconductivity of the gas in the primary chamber from the known thermoconductivity of pure hydrogen.

References Cited by the Examiner

UNITED STATES PATENTS

| | | | |
|---|---|---|---|
| 2,773,561 | 12/1956 | Hunter | 55—16 |
| 3,002,853 | 10/1961 | Findley | 55—162 |
| 3,022,858 | 2/1962 | Tillyer et al. | 55—16 |
| 3,100,868 | 8/1963 | McAlfee. | |

REUBEN FRIEDMAN, *Primary Examiner.*

J. ADEE, *Assistant Examiner.*